US010395533B2

(12) United States Patent
Altinger et al.

(10) Patent No.: US 10,395,533 B2
(45) Date of Patent: Aug. 27, 2019

(54) METHOD FOR ACQUIRING AND PROVIDING A DATABASE WHICH RELATES TO A PREDETERMINED SURROUNDING AREA AND CONTAINS ENVIRONMENTAL DATA

(71) Applicant: AUDI AG, Ingolstadt (DE)

(72) Inventors: Harald Altinger, Gerolfing (DE); Christoph Sippl, Beratzhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/073,287

(22) PCT Filed: Jan. 25, 2017

(86) PCT No.: PCT/EP2017/051487
§ 371 (c)(1),
(2) Date: Jul. 26, 2018

(87) PCT Pub. No.: WO2017/148623
PCT Pub. Date: Sep. 8, 2017

(65) Prior Publication Data
US 2019/0005818 A1 Jan. 3, 2019

(30) Foreign Application Priority Data

Mar. 3, 2016 (DE) .................. 10 2016 002 603

(51) Int. Cl.
G08G 1/0967 (2006.01)
H04L 29/08 (2006.01)
(Continued)

(52) U.S. Cl.
CPC . G08G 1/096791 (2013.01); G08G 1/096741 (2013.01); G08G 1/096783 (2013.01);
(Continued)

(58) Field of Classification Search
CPC ........ G08G 1/096791; H04L 29/08324; H04L 29/08333; H04L 29/08342; H04L 29/08351; H04W 84/18
See application file for complete search history.

(56) References Cited

U.S. PATENT DOCUMENTS 5,428,544 A * 6/1995 Shyu .................. G01C 21/3492
340/902
6,615,137 B2 * 9/2003 Lutter .................. G08G 1/0965
340/436
(Continued)

FOREIGN PATENT DOCUMENTS

CN 104468140 A 3/2015
DE 19903909 A1 8/2000
(Continued)

OTHER PUBLICATIONS

Fan Li and Yu Wang. "Routing in Vehicular Ad Hoc Networks: A Survey", IEEE Vehicular Technology Magazine, Jun. 2007, 11 pages.*

(Continued)

Primary Examiner — George C Neurauter, Jr.
(74) Attorney, Agent, or Firm — Staas & Halsey LLP

(57) ABSTRACT

Data relating to at least the dynamic objects of the surrounding area is ascertained by sensors of at least one motor vehicle. The data is stored in a database provided by a motor vehicle, acting as a server for the surrounding area, which communicates with other motor vehicles. When a request message is received, the motor vehicle acting as a server transmits at least one part of environmental data in the database to the requesting motor vehicle and/or transmits a request message for transmitting environmental data, relating to the requested data about at least one object, to other motor vehicles to update the database and/or captures environmental data relating to the at least one object by other (Continued)

sensors. The database is updated to include the transmitted or captured environmental data.

15 Claims, 2 Drawing Sheets

(51) Int. Cl.
*H04W 84/18* (2009.01)
*G08G 1/16* (2006.01)
*H04W 4/46* (2018.01)

(52) U.S. Cl.
CPC ....... *G08G 1/163* (2013.01); *H04L 29/08324* (2013.01); *H04L 29/08333* (2013.01); *H04L 29/08342* (2013.01); *H04L 29/08351* (2013.01); *H04W 4/46* (2018.02); *H04W 84/18* (2013.01)

(56) References Cited

U.S. PATENT DOCUMENTS

| | | | | |
|---|---|---|---|---|
| 6,720,920 | B2* | 4/2004 | Breed | B60N 2/2863 342/357.31 |
| 6,768,944 | B2* | 7/2004 | Breed | B60W 40/06 213/36 |
| 6,922,632 | B2* | 7/2005 | Foxlin | G01C 21/16 342/357.31 |
| 6,985,089 | B2* | 1/2006 | Liu | G08G 1/0965 340/436 |
| 7,085,637 | B2* | 8/2006 | Breed | B60N 2/2863 340/440 |
| 7,110,880 | B2* | 9/2006 | Breed | B60N 2/2863 340/995.13 |
| 7,286,825 | B2* | 10/2007 | Shishido | H04L 29/06 370/328 |
| 7,546,182 | B2* | 6/2009 | Mudalige | G01S 5/0072 342/357.34 |
| 7,725,253 | B2* | 5/2010 | Foxlin | G01C 25/005 701/300 |
| 7,994,902 | B2* | 8/2011 | Avery | G08G 1/161 340/435 |
| 8,229,663 | B2* | 7/2012 | Zeng | B60W 40/02 180/168 |
| 8,510,324 | B2* | 8/2013 | Bai | G06F 7/00 707/766 |
| 8,774,033 | B2* | 7/2014 | Oh | H04W 74/0833 370/252 |
| 8,954,261 | B2* | 2/2015 | Das | G08G 1/163 342/457 |
| 8,965,677 | B2* | 2/2015 | Breed | B60W 30/04 701/301 |
| 9,057,781 | B2* | 6/2015 | Bando | G01S 19/49 |
| 9,103,671 | B1* | 8/2015 | Breed | G01C 11/025 |
| 9,104,965 | B2* | 8/2015 | Fritsch | G06N 7/005 |
| 9,495,870 | B2* | 11/2016 | Jana | H04W 4/023 |
| 9,620,008 | B2* | 4/2017 | Schmudderich | B60W 40/04 |
| 9,697,733 | B1* | 7/2017 | Penilla | G05D 1/0011 |
| 9,883,354 | B2* | 1/2018 | Moebus | G01S 5/0252 |
| 10,002,471 | B2* | 6/2018 | Blayvas | G01C 21/3453 |
| 2002/0198632 | A1* | 12/2002 | Breed | B60N 2/2863 701/1 |
| 2003/0191568 | A1* | 10/2003 | Breed | B60W 40/06 701/36 |
| 2004/0073360 | A1* | 4/2004 | Foxlin | G01C 21/16 701/517 |
| 2005/0060069 | A1* | 3/2005 | Breed | B60N 2/2863 701/408 |
| 2005/0088318 | A1 | 4/2005 | Liu et al. | |
| 2005/0137786 | A1* | 6/2005 | Breed | B60N 2/2863 701/482 |
| 2006/0027404 | A1* | 2/2006 | Foxlin | G01C 21/16 178/18.06 |
| 2009/0140887 | A1* | 6/2009 | Breed | G01C 21/165 340/990 |
| 2010/0093383 | A1 | 4/2010 | Kim | |
| 2011/0087433 | A1 | 4/2011 | Yester | |
| 2014/0302774 | A1 | 10/2014 | Burke et al. | |
| 2016/0295589 | A1* | 10/2016 | Nikopour | H04W 4/023 |
| 2017/0225678 | A1* | 8/2017 | Bariant | G01S 15/931 |
| 2018/0231387 | A1* | 8/2018 | Thiel | G01C 21/3602 |
| 2018/0239032 | A1* | 8/2018 | Thiel | G01C 21/30 |
| 2018/0365888 | A1* | 12/2018 | Satzoda | G06T 17/00 |
| 2019/0029002 | A1* | 1/2019 | Kotzer | H04W 72/04 |

FOREIGN PATENT DOCUMENTS

| | | |
|---|---|---|
| DE | 102007048809 A1 | 7/2008 |
| DE | 102008042565 A1 | 4/2010 |
| DE | 10202011994 A1 | 12/2013 |
| DE | 102014204694 A1 | 10/2014 |
| DE | 102013220312 A1 | 4/2015 |
| DE | 102014008353 A1 | 12/2015 |
| DE | 102016002603 | 3/2016 |
| EP | 2 385 511 A1 | 11/2011 |
| WO | PCT/EP2017/051487 | 1/2017 |

OTHER PUBLICATIONS

Hao Li, Manabu Tsukada, Fawzi Nashashibi, and Michel Parent. "Multivehicle Cooperative Local Mapping: A Methodology Based on Occupancy Grid Map Merging", IEEE Transactions on Intelligent Transportation Systems, vol. 15, Issue 5, Oct. 2014, 12 pages.*
International Search Report for PCT/EP2017/051487 dated May 30, 2017.
Office Action for German Application No. 102016002603.0 dated Nov. 17, 2016.
English Translation by WIPO, dated Sep. 7, 2018, of the International Preliminary Examination Report on Patentability for PCT/EP2017/051487.
Chinese Office Action for Chinese Application No. 201780007451.X dated Apr. 17, 2019.

* cited by examiner

METHOD FOR ACQUIRING AND PROVIDING A DATABASE WHICH RELATES TO A PREDETERMINED SURROUNDING AREA AND CONTAINS ENVIRONMENTAL DATA

CROSS REFERENCE TO RELATED APPLICATIONS

This application is the U.S. national stage of International Application No. PCT/EP2017/051487, filed Jan. 25, 2017 and claims the benefit thereof. The International Application claims the benefit of German Application No. 10 2016 002 603.0 filed on Mar. 3, 2016, both applications are incorporated by reference herein in their entirety.

BACKGROUND

Described below is a method for acquiring and providing a database which relates to a predetermined surrounding area and contains environmental data relating to at least the dynamic objects in the surrounding area, wherein the environmental data is acquired by sensors of at least one motor vehicle.

The perception and interpretation of the environment constitutes an essential task for an increasing number of vehicle systems in motor vehicles, in particular in piloted, consequently completely automatically guided, motor vehicles with a corresponding vehicle system which is designed to guide the motor vehicle completely automatically. In particular, complete detection of all the dynamic objects in the environment of the motor vehicle is indispensable for route planning in piloted motor vehicles or to support the driver using driver assistance systems, which applies in particular to surrounding areas in which complex traffic situations occur. A classic example of such a surrounding area is an intersection at which road users of a wide variety of types arrive from a wide variety of directions.

In order to detect dynamic (and if appropriate also static) objects, sensors (environmental sensors) are usually installed in the motor vehicles, these being, for example, radar sensors, cameras and the like, on which environmental data algorithms have set up for interpreting situations. In this context, approaches are known in which the interpretation of the environmental data, for example the creation of environmental maps used by further vehicle systems or their functions is based only on environmental data of the motor vehicle's own sensor system. In this context, specific areas, for example those in shadow, cannot be seen; furthermore, the sensing by the possibilities of the vehicle's own sensor system is restricted.

Consequently it has already been proposed to supplement a motor vehicle's own environmental data with that from other motor vehicles by using motor vehicle-to-motor vehicle communication. For example, DE 10 2008 042 565 A1 therefore discloses a method for operating a driver assistance device, in which the driver assistance device is provided with external sensor data about a traffic situation by at least one external device, and this external sensor data is used to operate the driver assistance device. The at least one further device can be a vehicle and/or a permanently installed infrastructure device, wherein in order to regulate the exchange of sensor data it is proposed to provide the data to the vehicle, for example, on request and/or after authorization.

This has already brought about a significant improvement, but there is enormous data traffic between the various motor vehicles which all correspondingly fill, through requests, their own data pool relating to the surrounding area in which the motor vehicle is currently moving. Particularly in surrounding areas in which a multiplicity of motor vehicles and, if appropriate, other road users are present, this results in a massive data traffic which adversely affects the execution of such a procedure. In addition, collected data is lost at the latest when a road user leaves the surrounding area.

SUMMARY

The method is based on the task of specifying a possible way of providing, in particular in a way which is effective in terms of communication, the most accurate and precise information possible about a predetermined surrounding area.

In the method there is a provision that the database is kept available by a motor vehicle, which serves as a server, in the predetermined surrounding area, which motor vehicle is designed to communicate with other motor vehicles, wherein when a request message is received, the motor vehicle which serves as a server transfers as least a portion of the environmental data in the database to the requesting motor vehicle, and/or on the one hand transmits an interrogation message for the transmission of environmental data relating to the at least one object to other motor vehicles in order to update the database, and/or on the other hand records environmental data relating to the at least one object by its own sensors, wherein the database is updated on the basis of the transmitted or recorded environmental data.

In this context, the database may be embodied as a map of the environment in which static objects in the surrounding area are also marked. In order to ensure an interpretation of a scene and/or further planning of a journey on the basis of environmental data which is as precise as possible, the method described below centrally provides in a motor vehicle a data pool in the form of the database (map of the environment) which contains all the required information. This database is accessible to motor vehicles in a circular area, to be defined and including, in particular, at least the predetermined surrounding area, about the motor vehicle which serves as a server, and can be extended dynamically by the motor vehicle which serves as a server and by other motor vehicles as well, if appropriate, further road users, with the result that the latter are configured for corresponding communication. Other motor vehicles and, if appropriate, also other further road users can make requests with respect to the predetermined surrounding area using a request message, which may be transmitted as a broadcast without knowledge of the server, wherein at least part of the database is supplied to the corresponding motor vehicle in accordance with the request.

Such a database, which is filled by a plurality of motor vehicles and, if appropriate, further road users, permits interpretations of situations to be carried out in a complete and precise way even when all the required environmental data cannot be obtained by a vehicle's own sensor system, for example as a result of masking. In particular, it is also possible to check initially whether all the required information relating to a dynamic object is already present in the database, with the result that in the motor vehicle in question it is possible to omit evaluation of corresponding environmental data and computational power which becomes free can be used elsewhere or there can even be a saving in energy.

As a result of the fact that a motor vehicle functions as a type of central server, not only is a central data collection point produced which contains as precisely as possible all the available information relating to at least dynamic objects in the predetermined surrounding area, there is also a reduction in the general data traffic, since requests only have to be answered by the server. The data pool can always be kept up to date at a central location and therefore adapts dynamically to the traffic situation which is actually present. If the database is passed on from a motor vehicle which serves as a server to a motor vehicle which serves as a server, on which more precise information is given below, and therefore the database is kept in the predetermined surroundings, no information is lost, wherein nevertheless a highly up-to-date and highly precise database is continuously maintained.

The updating of the database on the part of the motor vehicle which serves as a server can be carried out not only on the basis of the motor vehicle's own sensor data of its own sensor system but also by virtue of the fact that the server interrogates environmental data from other motor vehicles or from their sensors with an interrogation message. The environmental data which is transmitted in reaction to the interrogation message from other motor vehicles is then also taken into account during the updating.

In order to communicate with other motor vehicles, the motor vehicles which participate in the method may have a motor vehicle-to-motor vehicle-communication device (c2c communication device) which may include a transmitter and a receiver. In this context, a standard which is used within the scope of the motor vehicle-to-motor vehicle communication, in particular an WLAN standard, can be used. It is also to be noted that it is basically conceivable also to keep available a map of the environment or a comparable data structure in each motor vehicle per se, into which map or structure the environmental data in the database which has been transmitted by the server, can be input, wherein the corresponding map of the environment or general data structure of the respective motor vehicle is supplemented in this way by at least one function of a vehicle system, in particular of a driver assistance system and/or of a vehicle system which is configured to guide the motor vehicle completely automatically.

The predetermined surrounding area can be, in particular, an intersection and/or an area around a pedestrian crossing. Dynamic objects which occur there are, in particular, pedestrians who are particularly to be protected. Pedestrians additionally usually stop in the predetermined surrounding area for a longer time than motor vehicles which are passing through, with the result that the particular advantages will become apparent here if continuously refined and dynamically updated environmental data is retained even beyond the time for which motor vehicles are present in the predetermined surrounding area.

In particular in this respect one development of the method provides that when a transfer criterion is satisfied, the motor vehicle which hitherto serves as a server transfers the database to a motor vehicle which serves as a new server and which assumes the role of server. Therefore, if a transfer criterion is satisfied, the role of server changes, in particular to a motor vehicle which is expected still to remain present in the predetermined surrounding area for a relatively long time and/or which provides, by its own sensor system, a particularly reliable data source for updating the database. In this context, different variants both of the transfer criterion and of the transfer are possible. If, for example, a motor vehicle which serves presently as a server detects that the transfer criterion is satisfied, it can transmit the database as a broadcast. Other motor vehicles can then check, for example on the basis of a server criterion, further details of which will be given below, whether the respective motor vehicle itself is to serve as a new server, wherein this motor vehicle then stores the database and assumes the role of server. It is, of course, also conceivable that in the motor vehicle that has previously been serving as a server, when the transfer criterion is satisfied it is already possible to determine which other motor vehicle satisfies the server criterion and consequently is to be used as a new server with the result that targeted communication to this motor vehicle can also take place. Finally, it is even possible for the satisfaction of the transfer condition to be determined in another motor vehicle, for example for it to be determined that the server criterion for this determining motor vehicle is now satisfied (and therefore can no longer be satisfied for the previous server). The motor vehicle for which the server criterion is satisfied can then request the database in a targeted fashion from the motor vehicle which has previously been serving as a server, and can assume the role of server.

Within the scope of the transfer criterion it is possible to check whether a further motor vehicle which serves as a future server is located closer to at least one outstanding location, which can be detected by the motor vehicles, within the surroundings than the motor vehicle which currently serves as a server, and/or whether the motor vehicle which currently serves as a server leaves the predetermined surrounding area. A server criterion can therefore be that the motor vehicle which is located closest to an outstanding location within the predetermined surrounding area assumes the role of server. In the case of a transfer the corresponding motor vehicle is then selected as a new server. In this context, a combination which means that if the motor vehicle which is currently serving as a server leaves the predetermined surrounding area (transfer criterion) it is possible to check which further motor vehicle is located closest to the outstanding location within the surrounding area (server criterion) and has to serve as a new server is also conceivable here. This last-mentioned configuration is desirable since then extremely frequent changes of the role of server do not occur but instead a role of server which is allocated according to a specific server criterion can be maintained as long as the motor vehicle which serves as a server is located within the predetermined surrounding area, wherein, of course, the communication range of the motor vehicle which serves as a server should also generally cover at least the surrounding area, as has already been explained.

The location can expediently relate to a static and/or dynamic object in the surrounding area. For example, in the case of the vicinity of a pedestrian crossing as a predetermined surrounding area the proximity of motor vehicles to the pedestrian crossing can be considered to be a server criterion or, if appropriate, also transfer criterion. In the case of an intersection, for example a detectable static object in the actual intersection region is appropriate, for example a specific road sign or the like. However, it is also conceivable to relate the location to a dynamic object, for example to a specific selected pedestrian or the like, wherein the dynamic object which defines the location then also has to be determined dynamically, in particular on the basis of a selection criterion. The selection criterion can check, for example, whether a criticality value which describes the safety criticality of the current traffic situation for the dynamic object is at a maximum. Using such a dynamic object to define the location is expedient because then the most critical dynamic object from which environmental data is most likely to be required is used to determine as the server a motor vehicle which is as close as possible to this critical object, and consequently the vehicle's own environmental data of the object which serves for updating can be recorded in an optimum fashion by the sensor system of the motor vehicle and made to flow into the database.

In one development of the method there can be a provision that the environmental data in the database can be converted, in particular taking into account a relative position information item which is contained in the request message, before the transfer to a coordinate system of the requesting motor vehicle and/or a global coordinate system. If the environmental data in the database is consequently not present in any case in a global coordinate system which can be used for all motor vehicles, or if the reception is already desired in a coordinate system relating to the motor vehicle in question, corresponding conversion can already take place before the transmission, because the relative position of the requesting motor vehicle with respect to the motor vehicle which serves as a server or a general absolute position information item with respect to the motor vehicle which serves as a server is present.

Both in the case just discussed as well as during the checking of transfer criteria, server criteria and the like, it is ultimately necessary for an assignment of possible communication partners and of objects which have been detected by the vehicle in question or are described in the database to be brought about in order to permit appropriate communication. For this purpose, an expedient development of the method provides that to assign motor vehicles which can be reached by the motor vehicle-to-motor vehicle-communication to objects contained in the database, environmental data received by the motor vehicles is compared with the environmental data in the database which relates to a coordinate system of the motor vehicle which currently serves as a server. It is therefore expedient if basically the scope of the communication includes certain environmental data items which permit the motor vehicle to be positioned in the database, in particular in a map of the surroundings, and therefore make possible assignment to a specific object which is described by the environmental data in the database. In this context, for example any message which is used in the method can contain a current absolute position of the actual transmitting motor vehicle and/or a relative position indication with respect to a specific static object, wherein it is, of course, also conceivable, in particular in the case of a response to an interrogation message, for environmental data relating to a plurality of detectable objects to be included, which permits a combinatorial assignment to objects within the database, which is embodied, in particular, as a map of the surroundings. It is therefore in particular also possible, in the case of transfer criteria and server criteria, for motor vehicles which serve as a new server to be identified and for the actual role relative to that of other motor vehicles to be assessed. Once an assignment has been made it is, of course, also possible to store it in the database, for example an identification information item which is used within the scope of the motor vehicle-to-motor vehicle communication can be assigned to a motor vehicle corresponding to a dynamic object.

An expedient development of the method provides that static objects which have a traffic-relevant, changing state, are also recorded in the database. While, of course, basically static objects can also be part of the environmental data in the database, it is particularly appropriate to record static objects which change their state dynamically, along with state information, in the environmental data in the database.

A classic example of this is a traffic light whose switched state without doubt has influence on the assessment of the current traffic situation.

With respect to static objects in the predetermined surrounding area it is particularly expedient if when the database is re-created or updated, a basic map which is obtained from a stationary server device and describes static objects in the predetermined surrounding area is used in addition to transmitted or recorded environmental data and/or in order to integrate environmental data obtained in response to a request message from the motor vehicle which serves as a server. Such a basic map can be downloaded, for example, from what is referred to as a cloud for the predetermined surrounding area. It may contain the static objects, for example road profiles, buildings, road signs and the like, which are present in the predetermined surrounding area. The static objects do not necessarily have to be newly measured dynamically and evaluated dynamically, since they are invariable. Therefore, such a basic map provides an excellent basis for setting up on the basis thereof the database which focuses on dynamic objects and, if appropriate, static objects which change their state. Such a basic map can also expediently be used by requesting motor vehicles.

The request message may contain a selection information item which describes a specific sub-surrounding area of the predetermined surrounding area, wherein only environmental data of the sub-surrounding area is transmitted to the requesting motor vehicle. In this way it is possible to reduce further the data traffic in the vicinity of the predetermined surrounding area, since the entire database does not have to be transmitted but rather a restriction to relevant sub-surrounding areas of the predetermined surrounding area is made possible, for example sub-surrounding areas which lie ahead of the requesting motor vehicle in the direction of movement. It is also particularly advantageous if the sub-surrounding area is acquired as a part of the predetermined surrounding area which cannot be sensed, or cannot be completely sensed, by sensors of the requesting motor vehicle. If the requesting motor vehicle consequently detects gaps in its detection of the surrounding area, a selection information item for this gap can be integrated in a targeted fashion into the request message, with the result that environmental data which fills the gap can be obtained from the database.

BRIEF DESCRIPTION OF THE DRAWINGS

Further aspects, advantages and details can be found in the exemplary embodiments which are described below, and on the basis of the drawings, in which.

DETAILED DESCRIPTION OF THE PREFERRED EMBODIMENT

Figure 1:
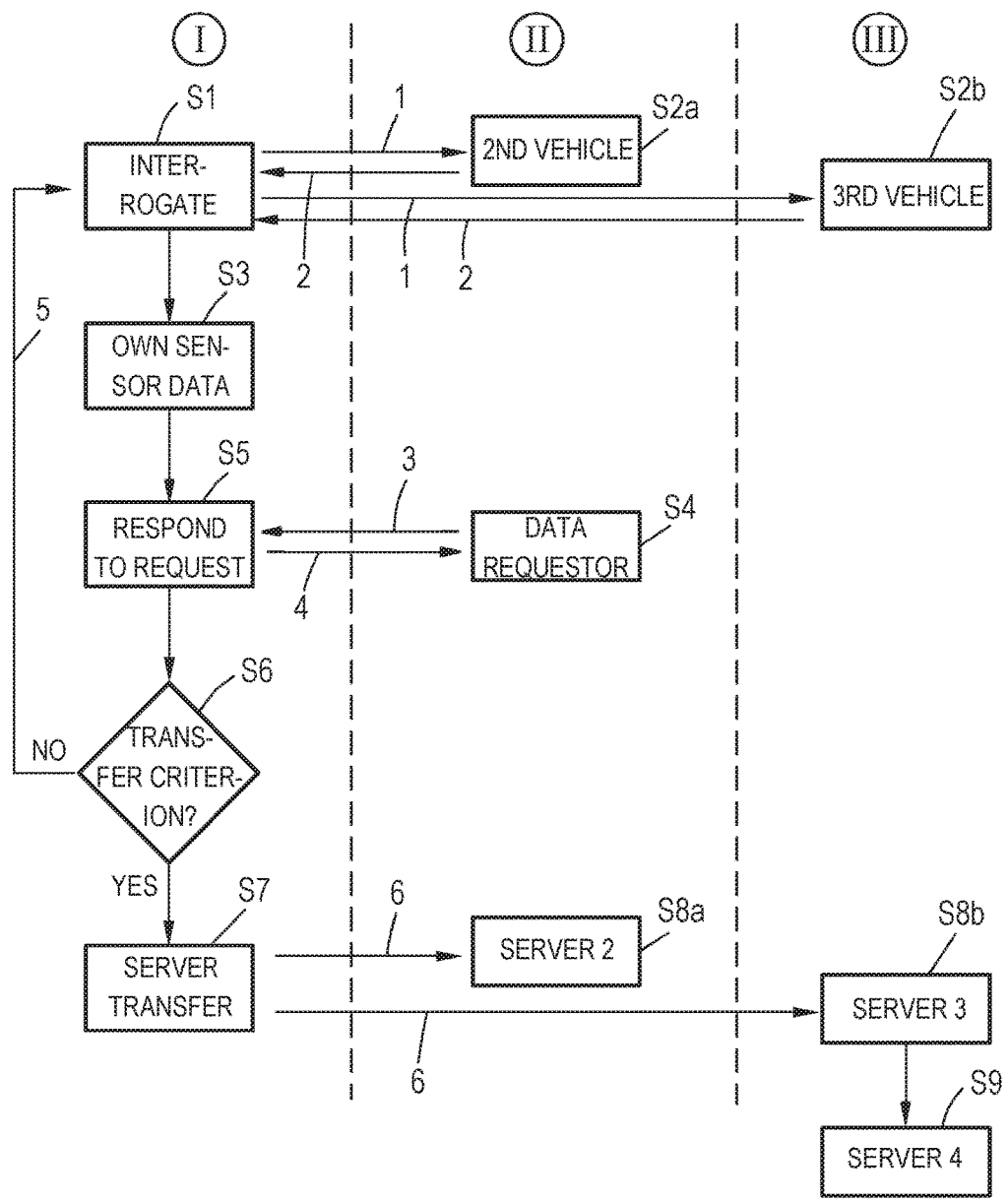
FIG. 1 is a flowchart of an exemplary embodiment of the method.

Reference will now be made in detail to the preferred embodiments, examples of which are illustrated in the accompanying drawings, wherein like reference numerals refer to like elements throughout.

FIG. 1 shows a schematic flowchart of an exemplary embodiment of the method. This method is concerned in particular not only with obtaining as reliably as possible information which has been acquired by sensors of motor vehicles and relates to dynamic objects in a predetermined surrounding area, but also to provide other motor vehicles in the predetermined surrounding area with the information in a simple and centralized fashion. The database which is embodied here as a map of the environment and contains not only information about dynamic objects but also information relating to static objects, in particular also relating to static objects which change their state, such as traffic lights, in this context continuous dynamic updating and refinement is carried out on the basis of incoming sensor data of a motor vehicle itself which acts as a server as well as further motor vehicles in the predetermined surrounding area, wherein, of course, a static evaluation of multiply present, identical information items, can also be carried out, in order to make available a particularly high-precision map of the environment as a database. An intersection with the area surrounding it is to be considered here, for example, as a predetermined surrounding area.

The first setting of the database and its re-creation is based here on a basic map of the predetermined surrounding area which can itself be kept available in a retrievable fashion by an infrastructure device, configured for communication with motor vehicles, in the region of the predetermined surrounding area, but can also be obtained, for example, from a central computing device via the Internet or from a miscellaneous Cloud. The basic map contains static, invariable objects in the predetermined surrounding area, with the result that the environmental data which relates to it no longer has to be evaluated, since these static objects are present in unchanged form or at least only in a form which can be varied at least only over a very slow time scale.

The method makes use of one of the motor vehicles located in the vicinity of the predetermined surrounding area as a server which keeps the database up to date and, when a request message is received makes at least a portion of the environmental data in the database available to other motor vehicles in the predetermined surrounding area. FIG. 1 explains processes of the exemplary embodiment in a schematic form, wherein for the sake of simplicity a differentiation is only made here between domains I, II and III of a first, of a second and of a third motor vehicle. This means that the method described in the corresponding domains I, II and III are carried out by in each case at least one control unit of the respective motor vehicle, wherein a motor vehicle-to-motor vehicle communication device is used for each motor vehicle in order to set up the communication.

In this context, the updating of the database will firstly be discussed in more detail. For this purpose, the first motor vehicle, which serves currently as a server, transmits, in S1 according to the arrows 1, an interrogation message to all the other motor vehicles in the predetermined surrounding area, here the second motor vehicle and the third motor vehicle. When the interrogation message is received in the second or third motor vehicle, in S2a and S2b current environmental data of the sensors of the second and of the third motor vehicles, which relate to dynamic objects in the predetermined surrounding area, is combined and transmitted back, according to the arrows 2, to the first motor vehicle which serves as a server. In this context is to be noted that the interrogation message can equally easily also contain a restriction information item, and consequently the interrogation of environmental data of further motor vehicles can relate to specific sub-surrounding areas of the predetermined surrounding area, for example of a type which the first motor vehicle which serves as a server cannot sense with its sensors, and/or can relate to specific types of environmental data items, for example sensor data items from environmental sensors which the first motor vehicle which serves as a server does not have or does not have for a specific sub-surrounding area. If the first motor vehicle which serves as a server is, for example, not equipped with radar sensors, radar data can be requested in a targeted fashion as environmental data from the further motor vehicles. The data traffic can therefore be reduced by using a restriction information item.

In S3, the sensors of the first motor vehicle, in particular the environmental sensors, are used, in particular in parallel with S1, to obtain further current environmental data which can be used to update the database. Likewise in S3, the updating of the database is then carried out using the environmental data acquired by the vehicle's own sensors and the environmental data transferred from other motor vehicles according to the arrows 2. Ultimately, all the data present is therefore combined at a central location in the first motor vehicle, with the result that a highly up to date dynamic data pool is produced which is made available to all the requesting motor vehicles via the first motor vehicle which serves as a server.

Therefore, for example the second motor vehicle transmits a request message as a broadcast in S4, cf. arrow 3. If this request message 3, which given knowledge of the server by the second motor vehicle can also be aimed directly at the first motor vehicle, is received by the first motor vehicle in S5, the first motor vehicle evaluates the request message with respect to a selection information item which limits the number of the environmental data items from the database to be transmitted. For example, the selection information can also describe sub-surrounding areas which precede the second motor vehicle and/or which cannot be sensed by the second motor vehicle itself or its sensors. The environmental data items which correspond to the selection information and which relate to dynamic objects and to static objects having changing traffic-relevant states are then transmitted to the second motor vehicle according to the arrow 4 and can be correspondingly used there, in particular to supplement an environmental map of the vehicle, which map is, if appropriate, also based on the basic map and can then be used by functions of various vehicle systems. In embodiments it is, of course, also conceivable that if no selection information is present, the entire environmental data in the database which relates to dynamic objects and static objects having traffic-relevant changing states is transferred to the requesting motor vehicle.

In S6, it is checked by the first motor vehicle which serves as a server whether a transfer criterion is satisfied. The first motor vehicle has been selected as a server because it has satisfied a server criterion, which means in the present case it was the motor vehicle which was located closest to a defined location in the predetermined surrounding area. The defined location can relate here to a static object, but, if appropriate, also to a specific dynamic object, in particular one whose criticality value is highest, that is to say is most relevant for the assessment of traffic situations and for which data is most necessarily required. In this context it is also to be noted that such a server criterion can, of course, be checked by every motor vehicle itself as long as the defined location which can, of course, also change dynamically can be identified precisely like other vehicles and their positions relative to the location, which is equally well made possible by the use of the database or of current environmental data contained in it, such as can also be carried out, if appropriate, by the use of environmental data of sensors in the motor vehicles in question. The assignment of communication partners to objects which are described in environmental data can also be easily made possible in that corresponding additional information which permits a comparison is contained in transmitted messages.

The transfer criterion is provided here by virtue of the fact that the first motor vehicle leaves the predetermined surrounding area. If this is not the case, the first motor vehicle continues with its role as a server according to the arrow 5. However, if the first motor vehicle actually leaves the predetermined surrounding area, it gives up the role of server in S7. For this purpose, in this exemplary embodiment there is specifically provision that the database is transferred by broadcast to the further motor vehicles according to the arrows 6, which motor vehicles respectively check in S8*a* and S8*b* whether the server criterion is satisfied for them, consequently they check here whether they are the motor vehicle which is located closest to the defined location. This is the case for the third motor vehicle here, with the result that this motor vehicle receives and stores the database and even assumes the role as server in S9, until the transfer criterion is satisfied again.

It is to be noted that of course other transfer criteria can also be used, in particular transfer criteria which are coupled to the server criterion. It is therefore perfectly possible for a more frequent transfer always to take place to the motor vehicle which is currently located closest to the defined location. In addition it is to be noted that it is also perfectly conceivable already to determine, within the scope of S7, which other motor vehicle satisfies the server criterion and to set up a direct, targeted communication to this other motor vehicle.

Figure 2:
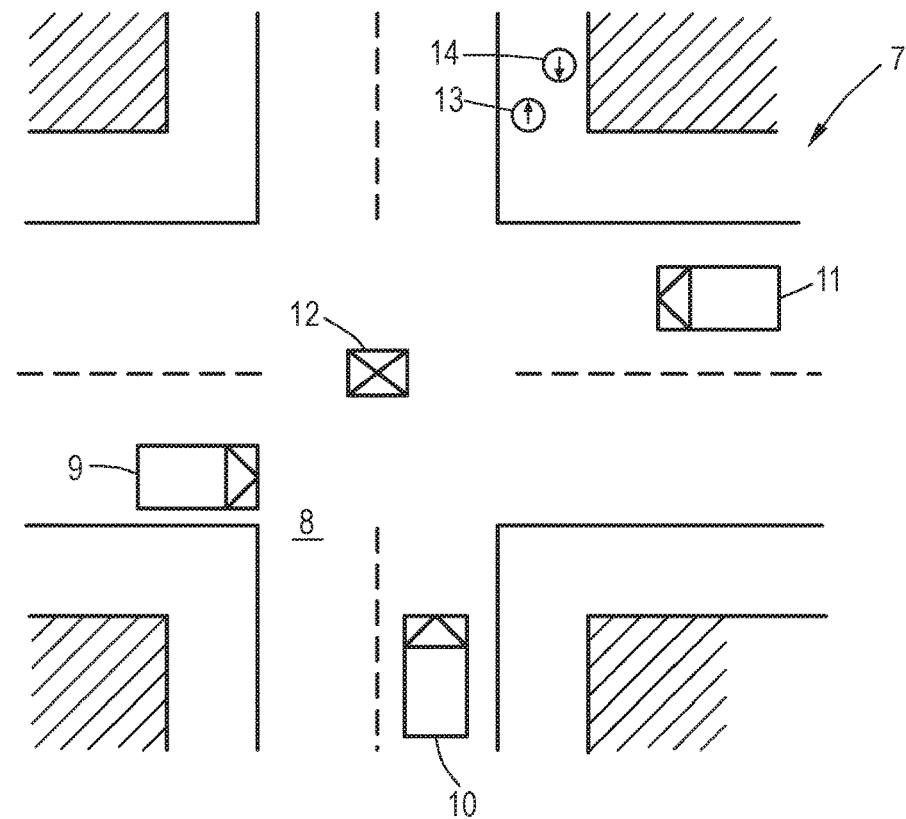
FIG. 2 is a plan view of a predetermined surrounding area for carrying out the method.

FIG. 2 shows, for the purpose of further explanation, a traffic situation in a predetermined surrounding area 7, here an intersection 8. Three motor vehicles 9, 10, 11 are shown, with the motor vehicle 9 serving here as a server, since it is closest to an outstanding location, for example the position of a street lamp 12 which illuminates the intersection and is arranged in the center thereof; but the server function can also be defined by the proximity to dynamic objects or the like.

In addition, two pedestrians 13, 14 are also shown as dynamic objects.

The motor vehicles 9 and 10 can each clearly detect the position of the pedestrians 13 and 14 here. However, the motor vehicle 10 cannot determine the orientation of the pedestrian 14, but requires it in order to interpret the situation. The orientation of the pedestrian 14 can, however, be detected by the motor vehicle 9 by its sensors. The motor vehicle 11 can in turn completely measure the pedestrian 13, but cannot perceive the pedestrian 14 at all by its own sensor system. As a result of the highly up to date dynamically updated database which is made available by the motor vehicle 9 which acts as a server it is, however, possible to respond to corresponding request messages of the motor vehicles 10, 11, with the result that the information which is missing is present there and the interpretation of the situation can be carried out correctly.

Figure 3:
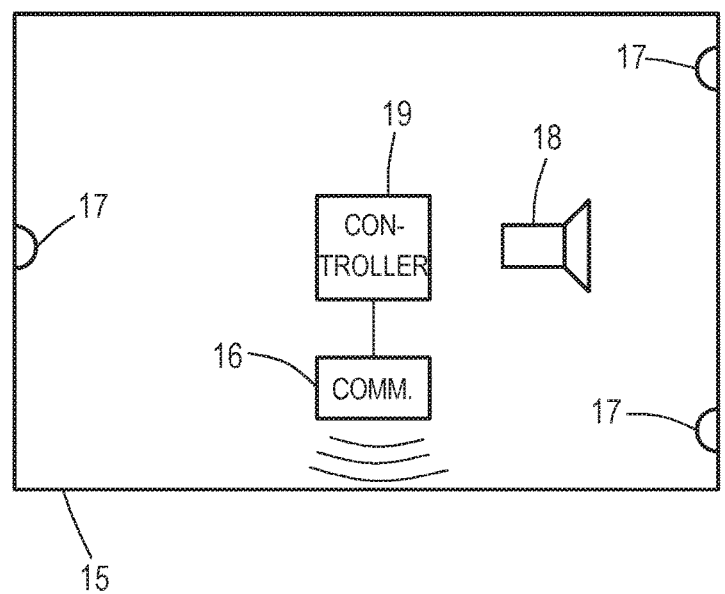
FIG. 3 is a block diagram of a motor vehicle which can be used within the scope of the method.

Finally, FIG. 3 shows a basic diagram of a motor vehicle 15 which can be used in performing the method. The motor vehicle 15 has a motor vehicle-to-motor vehicle communication device 16 via which messages can be received and output. In addition, the motor vehicle is provided with various sensors for sensing the environment, wherein radar sensors 17 and a camera 18 are shown here by way of example.

The various operations of the method described above can be carried out in a control unit 19 of the motor vehicle 15, specifically both when the motor vehicle 15 serves as a server as well as when it merely reacts to interrogation messages and/or would like to transmit request messages.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for acquiring and providing a database which relates to a predetermined surrounding area and contains environmental data relating to at least dynamic objects in the predetermined surrounding area, comprising:
    acquiring the environmental data from sensors of at least one motor vehicle;
    providing access to the database by a first motor vehicle, acting as a server in the predetermined surrounding area, the first motor vehicle providing a central data collecting point and communicating with other motor vehicles, including
        responding to a request message received from a second motor vehicle by transferring at least a portion of the environmental data in the database to the second motor vehicle,
        transmitting an interrogation message and in response receiving transmission of the environmental data relating to at least the dynamic objects to and from the other motor vehicles,
        updating the database based on the environmental data relating to at least the dynamic objects obtained by the sensors of the first motor vehicle and the environmental data received by the transmission from the other motor vehicles, and
        transferring, when a transfer criterion is satisfied, the database from the first motor vehicle acting as the server to a third motor vehicle which assumes responsibilities of the server.

2. The method as claimed in claim 1, further comprising, in determining whether the transfer criterion is satisfied, at least one of
    checking whether the third motor vehicle is located closer than the first motor vehicle to at least one location capable of being detected by the other motor vehicles within the predetermined surrounding area, and
    checking whether the first motor vehicle leaves the predetermined surrounding area.

3. The method as claimed in claim 2, wherein the at least one location relates to at least one of a static object and a dynamic object in the database.

4. The method as claimed in claim 3, further comprising converting the environmental data in the database, taking into account a relative position information item contained in the request message, to a coordinate system of the second motor vehicle, before at least the portion of the environmental data in the database is transferred to the second motor vehicle.

5. The method as claimed in claim 4, further comprising assigning the other motor vehicles which can be reached by motor vehicle-to-motor vehicle communication to vehicle objects contained in the database, based on received environmental data received from the other motor vehicles compared with stored environmental data in the database which relates to a coordinate system of the first motor vehicle.

6. The method as claimed in claim 2, further comprising recording static objects which have a traffic-relevant changing state in the database.

7. The method as claimed in claim 2, further comprising:
obtaining a basic map from a stationary server device describing static objects in the predetermined surrounding area; and
at least one of
re-creating or updating the database based on the basic map and transmitted or recorded environmental data, and
integrating at least the portion of the environmental data obtained by the second motor vehicle, in response to the request message, from the first motor vehicle with the basic map.

8. The method as claimed in claim 7,
wherein the request message contains a selection information item which describes a specific sub-surrounding area of the predetermined surrounding area, and
wherein only relevant environmental data of the sub-surrounding area is transferred to the second motor vehicle.

9. The method as claimed in claim 8, wherein the sub-surrounding area is a part of the predetermined surrounding area which cannot be completely sensed by sensors of the second motor vehicle.

10. The method as claimed in claim 3, further comprising assigning the other motor vehicles which can be reached by motor vehicle-to-motor vehicle communication to vehicle objects contained in the database, based on received environmental data received from the other motor vehicles compared with stored environmental data in the database which relates to a coordinate system of the first motor vehicle.

11. A method for acquiring and providing a database which relates to a predetermined surrounding area and contains environmental data relating to at least dynamic objects in the predetermined surrounding area, comprising:
acquiring the environmental data from sensors of at least one motor vehicle;
recording static objects which have a traffic-relevant changing state in the database; and
providing access to the database by a first motor vehicle, acting as a server in the predetermined surrounding area, the first motor vehicle providing a central data collecting point and communicating with other motor vehicles, including
responding to a request message received from a second motor vehicle by transferring at least a portion of the environmental data in the database to the second motor vehicle,
transmitting an interrogation message and in response receiving transmission of the environmental data relating to at least the dynamic objects to and from the other motor vehicles, and
updating the database based on the environmental data relating to at least the dynamic objects obtained by the sensors of the first motor vehicle and the environmental data received by the transmission from the other motor vehicles.

12. The method as claimed in claim 11, further comprising:
obtaining a basic map from a stationary server device describing static objects in the predetermined surrounding area; and
at least one of
re-creating or updating the database based on the basic map and transmitted or recorded environmental data, and
integrating at least the portion of the environmental data obtained by the second motor vehicle, in response to the request message, from the first motor vehicle with the basic map.

13. The method as claimed in claim 11,
wherein the request message contains a selection information item which describes a specific sub-surrounding area of the predetermined surrounding area, and
wherein only relevant environmental data of the sub-surrounding area is transferred to the second motor vehicle.

14. The method as claimed in claim 13, wherein the sub-surrounding area is a part of the predetermined surrounding area which cannot be completely sensed by sensors of the second motor vehicle.

15. A method for acquiring and providing a database which relates to a predetermined surrounding area and contains environmental data relating to at least dynamic objects in the predetermined surrounding area, comprising:
acquiring the environmental data from sensors of at least one motor vehicle;
providing access to the database by a first motor vehicle, acting as a server in the predetermined surrounding area, the first motor vehicle providing a central data collecting point and communicating with other motor vehicles, including
receiving a request message from a second motor vehicle for at least a portion of the environmental data in the database,
converting the environmental data in the database, taking into account a relative position information item contained in the request message, to a coordinate system of the second motor vehicle, before at least the portion of the environmental data in the database is transferred to the second motor vehicle,
transferring at least the portion of the environmental data in the database to the second motor vehicle,
transmitting an interrogation message and in response receiving transmission of the environmental data relating to at least the dynamic objects to and from the other motor vehicles, and
updating the database based on the environmental data relating to at least the dynamic objects obtained by the sensors of the first motor vehicle and the environmental data received by the transmission from the other motor vehicles.

* * * * *